United States Patent
Duffy et al.

(10) Patent No.: US 9,902,215 B2
(45) Date of Patent: Feb. 27, 2018

(54) WHEEL MONITORING DEVICE WITH NON-COPLANAR COMPONENT ARRANGEMENT

(71) Applicant: SCHRADER ELECTRONICS LIMITED, Antrim (GB)

(72) Inventors: Mark Duffy, Antrim (GB); Samuel Strahan, Ballymena (GB); Philip Dorman, Carrickfergus (GB); Emmanuel Marguet, LaMare (FR); Nicolas Henriet, Arcon (FR); Thomas Guillemin, Fallerans (FR)

(73) Assignee: Schrader Electronics Limited, Antrim, Northern Ireland (GB)

( * ) Notice: Subject to any disclaimer, the term of this patent is extended or adjusted under 35 U.S.C. 154(b) by 169 days.

(21) Appl. No.: 14/391,351

(22) PCT Filed: Apr. 10, 2013

(86) PCT No.: PCT/EP2013/057522
§ 371 (c)(1),
(2) Date: Oct. 8, 2014

(87) PCT Pub. No.: WO2013/153134
PCT Pub. Date: Oct. 17, 2013

(65) Prior Publication Data
US 2015/0068297 A1    Mar. 12, 2015

(30) Foreign Application Priority Data

Apr. 13, 2012 (GB) .................................. 1206569.4

(51) Int. Cl.
*B60C 23/04* (2006.01)

(52) U.S. Cl.
CPC .......... *B60C 23/04* (2013.01); *B60C 23/0494* (2013.01); *B60C 23/0491* (2013.01); *B60C 23/0493* (2013.01); *B60C 23/0498* (2013.01)

(58) Field of Classification Search
None
See application file for complete search history.

(56) References Cited

U.S. PATENT DOCUMENTS 4,048,614 A * 9/1977 Shumway ........... B60C 23/0494
200/61.25
6,005,480 A * 12/1999 Banzhof ............. B60C 23/0494
340/442

(Continued)

FOREIGN PATENT DOCUMENTS

DE       10301642 A1    7/2004
DE    102005051136 A1    5/2007
EP        1241028 A1    9/2002

*Primary Examiner* — Jill Culler
(74) *Attorney, Agent, or Firm* — Holland & Hart LLP

(57) ABSTRACT

A tire monitor for mounting on a wheel rim, the tire monitor comprising a housing having a first part (644A) configured to receive a component substrate (645) and a second part (644B) configured to receive one or more other components of the tire monitor, for example a battery. The first and second parts of the housing are non-coplanar and non-parallel with one another. When the tire monitor is mounted on the wheel rim, the substrate is non-coplanar and non-parallel with a plane (T) that is tangential to the wheel rim at the location where the tire monitor is mounted on the rim and preferably the substrate plane is substantially radial with respect to the wheel rim.

26 Claims, 4 Drawing Sheets

(56) References Cited

U.S. PATENT DOCUMENTS

| | | | |
|---|---|---|---|
| 6,163,255 A | 12/2000 | Banzhof | |
| 6,568,259 B2 * | 5/2003 | Saheki | B60C 23/0494 73/146 |
| 2004/0046649 A1 * | 3/2004 | Sanchez | B60C 23/0494 340/443 |
| 2006/0044118 A1 * | 3/2006 | Katou | B60C 23/0494 340/425.5 |
| 2007/0069876 A1 | 3/2007 | Leong et al. | |

* cited by examiner

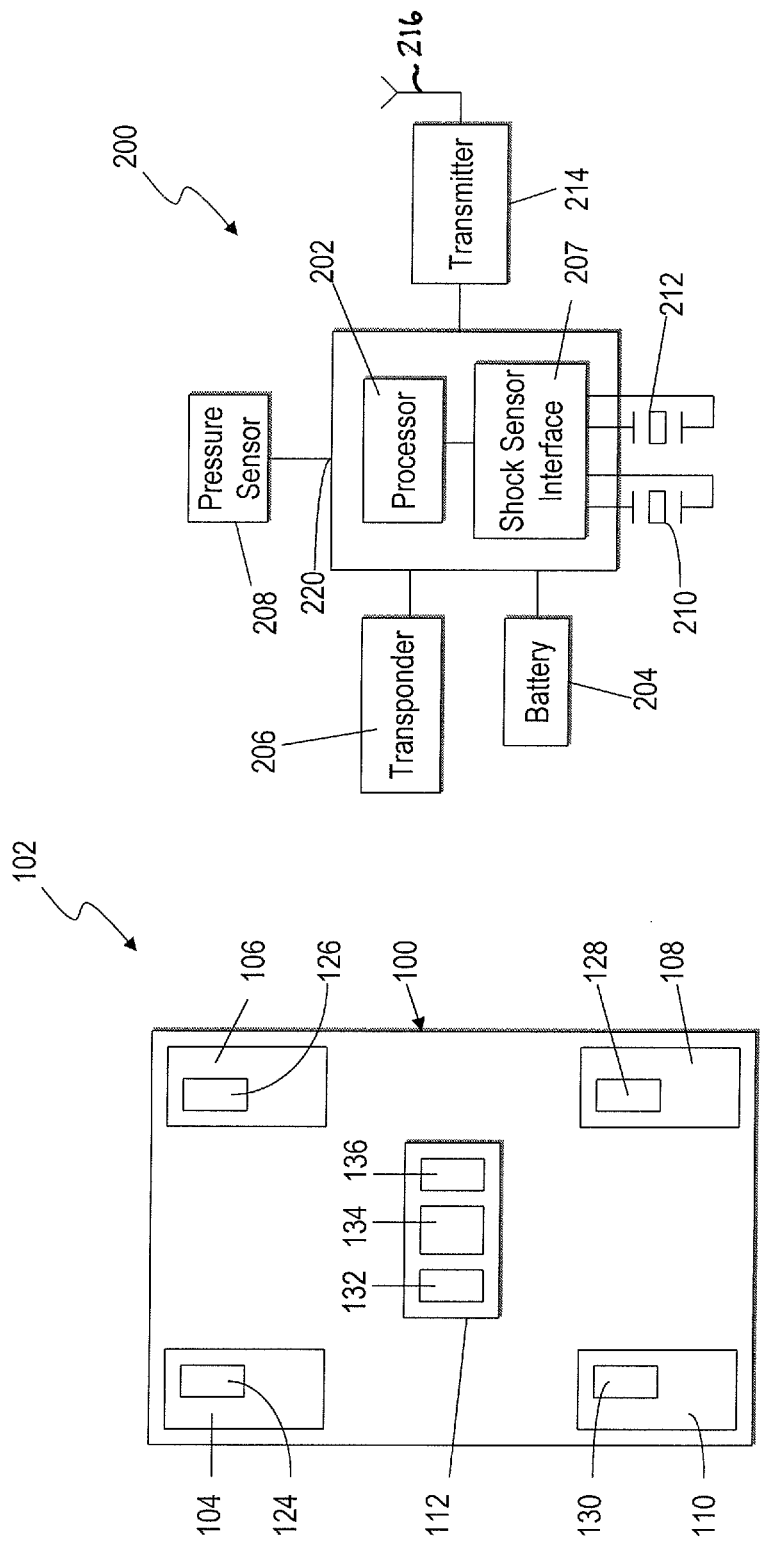

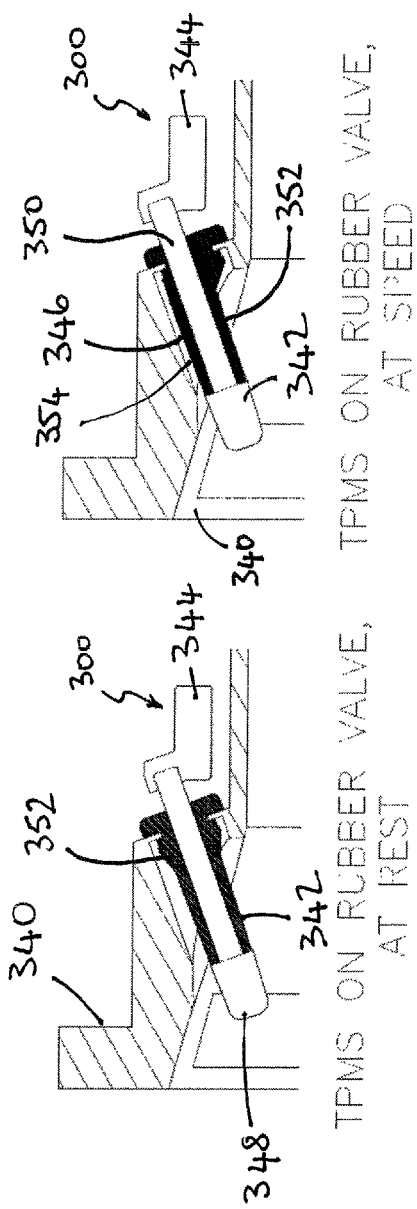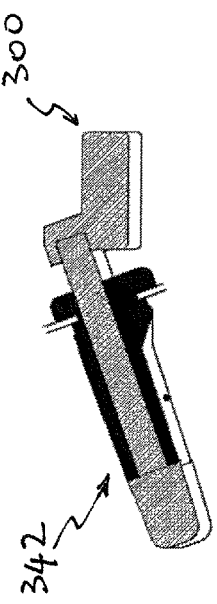

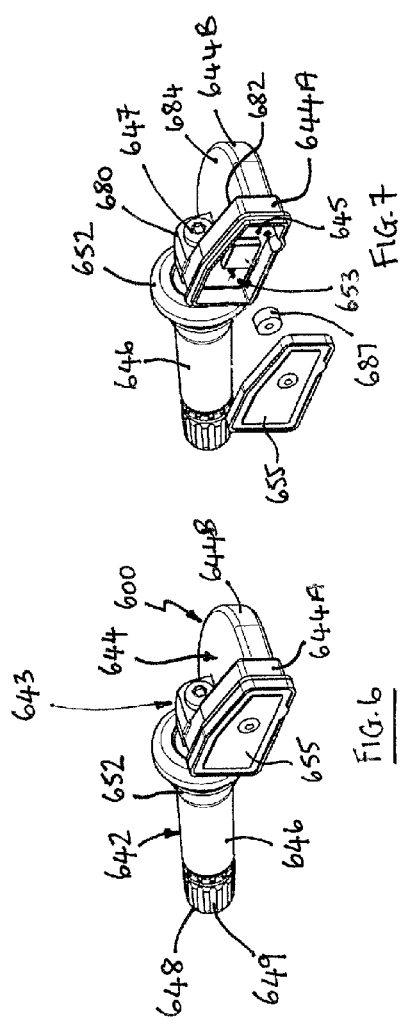

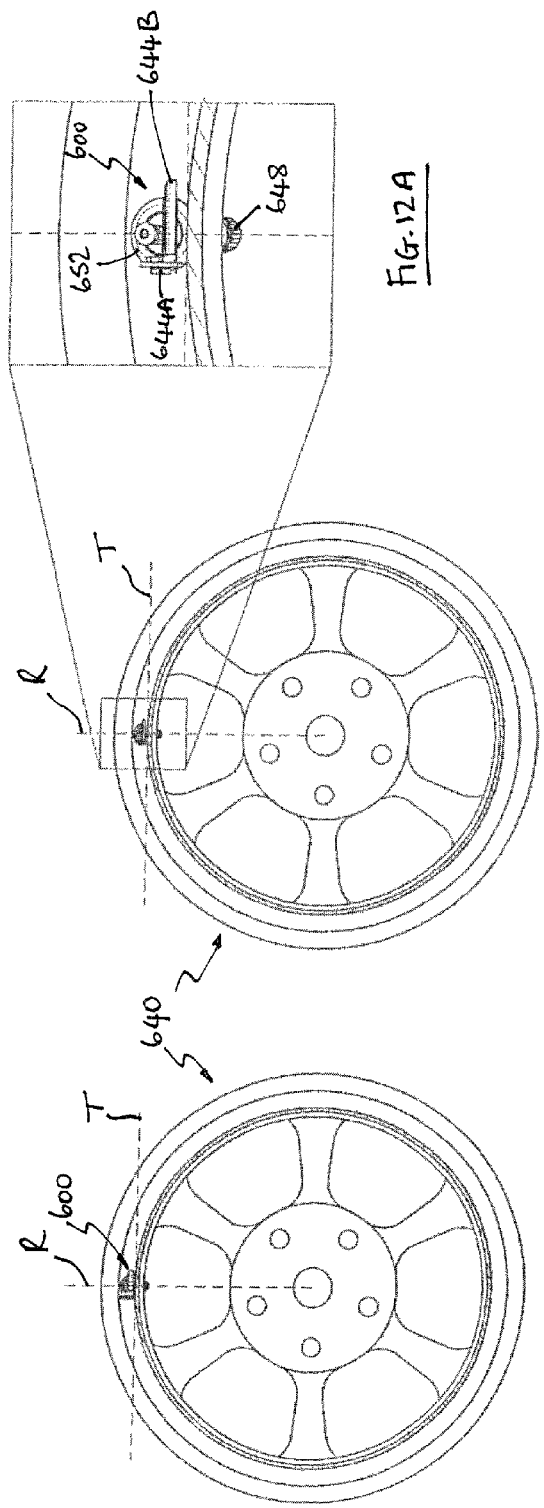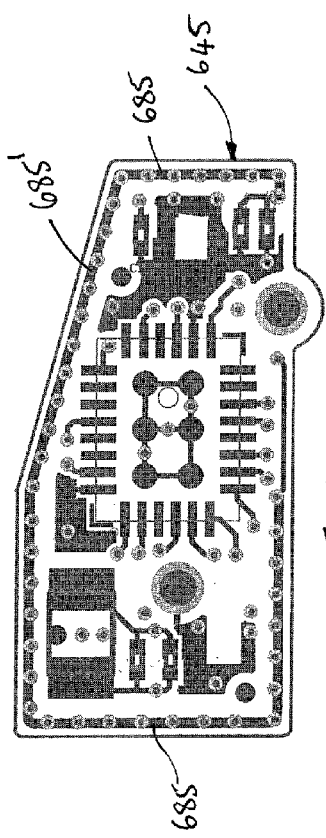

WHEEL MONITORING DEVICE WITH NON-COPLANAR COMPONENT ARRANGEMENT

CROSS-REFERENCES

This application is a US National stage of pending application PCT/EP2013/057522, filed Apr. 10, 2013, entitled "WHEEL MONITORING DEVICE WITH NON-COPLANAR COMPONENT ARRANGEMENT," which claims priority from pending patent application Ser. No. 12/065, 694.4, filed Apr. 13, 2012, entitled "Wheel Monitoring Device with Non-Coplanar Component Arrangement" which are hereby incorporated by reference, as if set forth in full in this document, for all purposes.

FIELD OF THE INVENTION

The invention relates to wheel monitoring devices, especially for use in Tyre Pressure Monitoring Systems (TPMS) or Tyre Monitoring Systems (TMS).

BACKGROUND TO THE INVENTION

Systems have been developed for monitoring characteristics, such as tyre pressure, tyre (air) temperature and/or acceleration of the wheels of a vehicle, or the battery voltage of a battery in a wheel mounted device. A wheel mountable device comprising one or more appropriate sensor(s) is located at each wheel, typically inside the tyre, which measures the relevant characteristic(s) and transmits corresponding information to a remote central monitoring station. An example of such a system is a Tyre Pressure Monitoring System (TPMS), of which the wheel mountable units are commonly referred to as tyre pressure monitors or tyre Pressure Monitoring (TPM) sensors.

Modern tyre monitors are typically snap-in type devices and so include a valve portion based on a conventional (with small modifications) snap-in tyre valve. Snap-in tyre monitors eliminate the need for a nut to hold the tyre monitor in place in the rim of the wheel on which it is mounted during use, which is advantageous since it simplifies the installation of the tyre monitor.

However, snap-in tyre monitors suffer from a problem at high vehicle speeds: as the vehicle accelerates from rest to higher speeds, a force is exerted on the tyre valve which becomes significant (for example 2000 g at very high speeds). This force increases with tyre monitor mass and with the speed of the vehicle. The relatively high forces can cause damage to rubber portions of the valve to the extent that an air leak can be caused (clamp in type tyre monitors do not have rubber on the valve, they still experience the force but are less prone to leaks because the valve is fixed rigidly with the retaining nut).

It would be desirable to reduce the mass and preferably also size of tyre monitors, especially but not exclusively to mitigate the above-identified problem relating to snap-in tyre monitors.

SUMMARY OF THE INVENTION

A first aspect of the invention provides a tyre monitor for mounting on a wheel rim, the tyre monitor comprising a housing configured to hold a component substrate in a substrate plane, wherein, when said tyre apparatus is mounted on said wheel rim, said substrate plane is non-coplanar and non-parallel with a plane that is tangential to the wheel rim at the location where the tyre monitor is mounted on the rim.

Preferably, the substrate plane is substantially perpendicular to said tangential plane, and preferably also substantially transverse of the wheel rim.

In preferred embodiments, the housing is configured to hold a battery in a plane that is non-coplanar and non-parallel with said substrate plane and substantially parallel or substantially coplanar with said tangential plane. The battery plane is preferably substantially perpendicular to said substrate plane.

The housing preferably comprises a first part configured to receive said substrate and a second part configured to receive one or more other components of the tyre monitor, the first and second parts of the housing being non-coplanar and non-parallel with one another. Advantageously, said first and second parts are substantially perpendicular with one another.

A second aspect of the invention provides a tyre monitor comprising a housing having a first part configured receive a component substrate, and a second part configured to receive one or more other components of the tyre monitor, the first and second parts of the housing being non-coplanar and non-parallel with one another, preferably substantially perpendicular with one another.

A third aspect of the invention provides a tyre pressure monitoring system (TPMS) wheel mountable unit comprising the tyre monitor of the first or second aspects of the invention.

A fourth aspect of the invention provides a tyre monitor and wheel rim assembly comprising the tyre monitor of the first or second aspects of the invention.

A fifth aspect of the invention provides a tyre monitoring system (TMS) tyre mountable device comprising the tyre monitor of the first or second aspects of the invention.

A sixth aspect of the invention provides a wheel monitoring device for mounting on a wheel rim, the monitoring device comprising a housing configured to hold a component substrate in a substrate plane, wherein, when said monitoring device is mounted on said wheel rim, said substrate plane is non-coplanar and non-parallel with a plane that is tangential to the wheel rim at the location where the monitoring device is mounted on the rim.

A seventh aspect of the invention provides a wheel monitoring device comprising a housing having a first part configured to receive a component substrate, and a second part configured to receive one or more other components of the monitoring device, the first and second parts of the housing being non-coplanar and non-parallel with one another, preferably substantially perpendicular with one another.

The wheel monitoring device of the sixth and seventh aspects may comprise any one or more of the features of the tyre monitor of the first and second aspects as would be apparent to a skilled person.

Preferred features are recited in the dependent claims.

Monitors embodying one or more aspects of the invention may be suitable for use with any type of valve, including snap-in and clamp-in valves, and may be wheel mountable or tyre mountable (in which case the monitor is typically not coupled to a valve).

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which like numerals are used to denote like parts and in which:

FIG. 1 is a block diagram of an embodiment of a tyre monitoring system (TPMS) shown in conjunction with parts of a vehicle;

FIG. 2 is a block diagram of a tyre monitoring apparatus included in the TPMS of FIG. 1;

FIG. 3 is a side sectional view of a snap-in tyre monitor mounted on a wheel and shown when the wheel is stationary;

FIG. 4 is a side sectional view of the snap-in tyre monitor of FIG. 3 shown when the wheel is rotating at relatively high speed;

FIG. 5 is a superimposition of the valves shown in FIGS. 3 and 4;

FIG. 6 is an isometric view of a tyre monitor embodying the invention together with a tyre valve;

FIG. 7 is an alternative isometric view of the tyre monitor and valve assembly of FIG. 6 shown with an exploded cover;

FIG. 8 is a plan view of a printed circuit board (PCB) suitable for use in preferred embodiments of the invention;

FIGS. 9 and 10 are respective isometric views of a tyre monitor embodying the invention mounted on a wheel rim using a tyre valve;

FIGS. 11 and 12 is are alternative side views of the tyre monitor and wheel rim assembly shown in FIGS. 6 and 7; and FIG. 12A is an enlarged view of part of FIG. 12.

DETAILED DESCRIPTION OF THE DRAWINGS

Referring now to FIG. 1 of the drawings, there is shown, generally indicated as 102, a wheel monitoring system that monitors vehicle load dynamics shown in situ on a vehicle 100, the system taking the preferred form of tyre pressure monitoring system (TPMS) for the purposes of illustration. For reasons of clarity, only those portions of the vehicle 100 and TMS 102 that are helpful in understanding the present invention are shown.

The vehicle 100, typically a 4-wheeled vehicle, includes wheels 104, 106, 108, 110, each wheel including a tyre mounted on a rim. The TPMS 102 includes a control unit 112 and wheel mountable devices comprising, in this example, tyre monitors 124, 126, 128, 130, which may also be referred to as sensors, transmitters, wheel monitors, wheel units, or the like. The tyre monitors 124, 126, 128, 130 measure one or more tyre characteristics, typically including tyre pressure and temperature, and transmit corresponding tyre data for reception and processing by the control unit 112. Typically, a respective tyre monitor is associated with each wheel of the vehicle 100.

In typical embodiments, the tyre monitors are capable of measuring at least tyre pressure and of transmitting data to the control unit 112, including data representing the measured tyre pressure and usually also identification information uniquely identifying the respective tyre monitor. Each of the tyre monitors 124, 126, 128, 130 includes a suitably powered wireless transmitter, conveniently a battery (or otherwise) powered radio frequency (RF) transmitter, and a pressure sensor for measuring the pressure of the gas (usually air) within the tyre. In such embodiments, the system 102 may be referred to as a tyre pressure monitoring system (TPMS) and the tyre monitors may be referred to as tyre pressure monitors or tyre pressure monitoring (TPM) sensors.

Any suitable control unit may be used in the system 102. By way of example, in the illustrated embodiment, the control unit 112 includes a controller 132 (e.g. a vehicle ECU and/or a BCU, or other processor (typically a suitably programmed microprocessor or microcontroller)), a memory device 134 and a receiver 136 for receiving wireless transmissions from the tyre monitors. More generally, the vehicle 100 may include one or more controllers, each typically comprising a suitably programmed microprocessor or microcontroller, e.g. the controller 112, one or more ECUs and/or one or more BCUs, and one or more other electronic units, such as the memory device 134 or receiver 136 and one or more sensors. These components are capable of communication with one another as required, usually by means of a vehicle communications bus, e.g. a CAN (controller area network) bus and/or LIN (local interconnect network), and together may be said to comprise the vehicle's communication network.

Referring now to FIG. 2, there is shown by way of example a block diagram of a typical tyre monitor 200, suitable for use as monitors 124, 126, 128, 130. The tyre monitor 200 includes a controller 202, a power source such as a battery 204, a pressure sensor 208, a wireless transmitter 214 and an antenna 216. It will be apparent that the monitor 200 may use any convenient power source instead of or as well as a battery, e.g. thermoelectric and/or piezoelectric generators and/or electromagnetic induction means and/or an energy harvester. The monitor 200 usually also includes a transponder coil 206 and commonly one or more piezoelectric motion sensors 210, 212. The tyre monitor 200 typically also includes a temperature sensor 209 for measuring the temperature of the tyre and/or of the gas within the tyre. In this illustration, the motion sensors 210, 212 each comprise a respective shock sensor of the type that produces an electrical signal in response to being subjected to acceleration (typically shock sensors are responsive to changes in acceleration, the electrical signal being indicative of, typically proportional to, the experienced acceleration or change in acceleration, especially the rate of change of acceleration). Alternatively, the sensors 210, 212 may each comprise an accelerometer or a microelectromechanical systems (MEMs) sensor. The main difference between an accelerometer and a shock sensor is that the output signal from a shock sensor is related to a change of force applied to the shock sensor, whereas the output signal from an accelerometer is proportional to the absolute force applied.

The controller 202 may be implemented by any suitable means, for example a microprocessor, microcontroller or other suitable data processing device configured and/or programmed to perform the functions described herein.

In the illustrated embodiment, the pressure sensor 208 detects the pneumatic air pressure of the tyre with which the tyre monitor 200 is associated. A temperature sensor (not shown) may be provided to measure the temperature of the tyre and/or of the air within the tyre. In alternative embodiments, the pressure sensor 208 may be supplemented with or replaced by other devices for detecting tyre data. An indication of the tyre data is provided to the controller 202 at an input 220. A shock sensor interface 207 is provided in the tyre monitor 200 and is configured to provide the necessary control signals and detect the electrical signals from the shock sensors 210, 212.

FIGS. 3 and 4 illustrate a tyre monitor 300 mounted on a wheel rim 340 (only part of which is shown). The tyre monitor 300 may be the same as or similar to the tyre monitor 200 and the same or similar description applies as would be apparent to a skilled person. The tyre monitor 300 is coupled to a tyre valve 342, in particular a pneumatic valve, e.g. of the type normally used for inflating and deflating vehicle tyres. The electronic circuitry and power supply (not visible) of the monitor 300 are provided in a housing 344 which is connected to the valve 342 by any suitable means. For example, the housing 344 may be releasably connected to the valve 342 by a releasable fixing, e.g. a screw or bolt, or permanently connected by for example adhesive or integrally forming the housing 344 with part of the valve 342. Typically, the housing 344 is located at an end of the valve stem 346, distal the user inlet/outlet 348.

The illustrated valve 342 is of a type commonly known as a snap-in valve, i.e. a valve provided with means for retaining, and preferably also sealing, the valve in the valve aperture upon insertion of the valve into the aperture. The valve stem 346 comprises a rigid inner tube 350 and a resiliently deformable outer casing 352. The inner tube 350 is typically formed from metal and the outer casing 352 is typically formed from rubber. The valve 342 is shaped and dimensioned to fit through a valve-receiving aperture 354 formed in the rim 340. The outer casing 352 is configured to resiliently deform when the valve 342 is fitted to the rim 340 in order to retain and seal the valve 342 in the aperture 354. To this end the casing 352 is typically shaped and dimensioned to provide an interference fit with the aperture 354. Normally the casing 352 covers substantially the entire valve stem 346, although it may alternatively cover only a portion of the stem 346 that is necessary to create the desired snap-in fit. Snap-in valves are most commonly used with tubeless tyres.

The combination of a valve 342 and tyre monitor 300 may be referred to as a tyre monitoring and valve apparatus or, in the case where the tyre monitor is a TPMS monitor, a TPMS valve. Apparatus of the type illustrated in FIGS. 3 and 4 may be referred to as a snap-in tyre monitoring and valve apparatus (or just "snap-in tyre monitor"), or a snap-in TPMS valve.

Snap-in tyre monitors suffer from a problem at high vehicle speeds: as the vehicle accelerates from rest to higher speeds, a force is exerted on the tyre valve and monitor which becomes significant (for example 2000 g at very high speeds). This force increases with the mass of the tyre monitor 300 and with the speed of the vehicle. The size and shape of the monitor 300 can also effect the forces experienced by the valve. The relatively high forces can cause damage to rubber portions (in particular the casing 352) of the valve 342 to the extent that an air leak can be caused. This is illustrated by a comparison of FIG. 3, which shows the valve 342 in a rest position when the vehicle is stationary, with FIG. 4, which shows what happens when the vehicle is travelling at relatively high speed: the valve 342 and monitor 300 moves upwards (as viewed) in the direction of the centrifugal force created by the rotating tyre. This can be seen also in FIG. 5 where the valve and monitor states from FIGS. 3 and 4 have been overlaid one on top of the other.

For example: for a typical rim/tyre configuration the g force exerted on the valve and tyre monitor would be approximately 165 g at 60 mph, 240 g at 70 mph and 430 g at 100 mph. During the complete time that the vehicle is travelling at high speed this force is always present. When the vehicle decelerates to rest, the force is removed from the valve/monitor. This continual application and removal of the force can cause the wheel rim to cut through the casing 352 over a prolonged time period. Under extreme circumstances this will result in air leaking from the tyre.

Referring now to FIGS. 6 and 7, there is shown a tyre monitor 600 embodying one aspect of the invention. The tyre monitor 600 may be the same as or similar to the tyre monitor 200 and the same or similar description applies as would be apparent to a skilled person, and may be suitable for use as monitors 124, 126, 128, 130. The tyre monitor 600 is coupled to a tyre valve 642, typically a pneumatic valve, e.g. of the type normally used for inflating and deflating vehicle tyres. The components of the monitor 600 are provided in a housing 644. The components typically include electrical and electronic circuitry, electrical and electronic components, a power supply (as illustrated by way of example in FIG. 2) and typically also associated mechanical components and fixings. It will be understood that the composition and configuration of components may vary from embodiment to embodiment and is not limiting to the present invention.

The housing 644 is coupled to the valve 642 by any suitable means. For example, the housing 644 may be releasably connected to the valve 642 by a releasable fixing 647, e.g. a screw or bolt or retaining clip, or permanently connected by for example adhesive or integrally forming the housing 644 with part of the valve 642. Typically, the housing 644 is located at an end of the valve stem 646, distal the user inlet/outlet 648 (which is usually fitted with a removable cap 649).

The illustrated valve 642 is of the snap-in valve type, i.e. a valve provided with means (for example comprising one or more resilient deformable portions) for retaining, and preferably also sealing, the valve in the valve aperture upon insertion of the valve into the aperture. In this example, the valve stem 646 comprises a rigid inner tube (not visible) and a resiliently deformable outer casing 652. The inner tube is typically formed from metal and the outer casing 652 is typically formed from rubber. The valve 642 is shaped and dimensioned to fit through a valve-receiving aperture formed in a wheel rim. The outer casing 652 is configured to resiliently deform when the valve 642 is fitted to the wheel rim in order to retain and seal the valve 642 in the aperture. To this end the casing 652 is typically shaped and dimensioned to provide an interference fit with the aperture.

In the illustrated embodiment, the casing 652 covers substantially the entire valve stem 646, although it may alternatively cover only a portion of the stem 646 that is necessary to create the desired snap-in fit.

The combination of the valve 642 and tyre monitor 600 may be referred to as a tyre monitoring and valve apparatus or, in the case where the tyre monitor 600 is a TPMS monitor, a TPMS valve. Where the valve 642 is a snap-in valve, the valve and tyre monitor assembly may be referred to as a snap-in tyre monitoring and valve apparatus (or just "snap-in tyre monitor"), or a snap-in TPMS valve.

Referring now to FIG. 8, at least some of the tyre monitor 600 components are provided on and/or in a substantially planar substrate 645. The substrate 645 may comprise a single layer substrate or a multi-layer substrate, and is typically formed from a dielectric or electrically insulating material. Typically, the substrate 645 comprises a printed circuit board (PCB). Usually at least some of the electrical and/or electrical components of the monitor 600, together with associated electrical connections and circuitry are provided in and/or on the substrate 645. This may be achieved using any convenient conventional techniques. In typical embodiments, the components carried by the substrate 645 include a controller (e.g. processor 202), a pressure sensor and wireless communications means (e.g. a wireless RF transmitter and usually also a LF transponder). By way of example, the substrate 645 may carry the components shown in FIG. 2, except for the battery 204. It will be understood that the composition and configuration of components carried by the substrate 645 may vary from embodiment to embodiment and is not limiting to the present invention.

Conventionally, the PCB of a tyre monitor, when fitted to a wheel rim, lies in a plane that is tangential to the wheel rim. In arriving at some aspects of the present invention, however, it has been found to be advantageous to configure the tyre monitor such that when it is fitted to a wheel rim, the substrate lies in a plane that is substantially radial with respect to the wheel rim, i.e. a plane in which a notional radial line and the rotational axis of the rim lie. As is described in more detail hereinafter, benefits of this orientation of the substrate can include any one or more of: reduced mass of the tyre monitor in comparison with conventional monitors; altered shape of the tyre monitor in comparison with conventional monitors; reduced size of the tyre monitor in comparison with conventional monitors. The mass, shape and size of the tyre monitor (individually or in any combination) can affect how the tyre monitor responds to the forces that are exerted on it as the wheel rim rotates during use, which in turn can affect the performance of the tyre monitor and/or the effect that it has on associated components, in particular the tyre valve. For example, in the illustrated embodiment, the tyre monitor 600 has a relatively low mass and this reduces the wearing effect described above in relation to snap-in valves.

In preferred embodiments, when the tyre monitor is fitted to the wheel rim, the substrate lies substantially in a radial plane, i.e. a plane in which the rotational axis of the wheel rim lies. However, angular deviation of the substrate plane from a radial orientation about an axis that is substantially parallel with the rotational axis of the wheel rim is possible, for example by up to 75°, but preferably no more than approximately 45°, more preferably no more than approximately 20°, and most preferably no more than 10°. Alternatively, or in addition, angular deviation of the substrate plane from a radial orientation about an axis that is substantially perpendicular to the rotational axis of the wheel rim is possible (in particular an axis that is both substantially perpendicular to the rotational axis of the wheel rim and to a notional tangential line at the location of the monitor on the rim, i.e. a substantially radial axis R), for example by up to 75°, but preferably of no more than approximately 45°, more preferably no more than approximately 20°, and most preferably no more than 10°. More generally, the substrate plane is non-coplanar and non-parallel with a plane that is tangential to the wheel rim at the location where the tyre monitor is mounted on the rim. The substrate plane may be oblique with respect to said tangential plane at least about an axis that is substantially perpendicular to the rotational axis of the wheel rim, but is preferably substantially perpendicular to the tangential plane, and preferably also substantially transverse of the wheel rim.

In typical embodiments, the power supply comprises at least one (usually only one) disc shaped battery (not illustrated), commonly known as a button cell or coin cell. Such batteries typically use lithium chemistry or silver oxide chemistry. For example, batteries designated with the IEC (International Electrotechnical Commission) prefix CR use lithium manganese dioxide chemistry, those given the prefix BR us lithium/carbon monofluoride chemistry and those with the prefix SR, LR, AG or SG use silver oxide chemistry. In the illustrated embodiment, it is assumed that the monitor 600 requires a single button cell battery, although in alternative embodiments, more than one button cell may be required in which case they may be stacked (connected in series).

The orientation of the (or each) battery when fitted to a wheel rim can be an important design consideration. In particular, it can be advantageous to orientate the battery such that it remains in a plane that is substantially tangential to the wheel rim as the vehicle moves, otherwise centrifugal forces experienced by the battery during use may adversely affect the discharge characteristics of the battery. If, for example, the battery were alternatively oriented radially with respect to the rim, the electrolyte within the battery would tend to move to the part of the battery that is furthest away from the centre of the wheel. This would cause the discharge of the cell to happen fastest in this area and the remainder of the cell would not share equally in the supply of the pulse loads that the tyre monitor application demands. This could manifest itself as uneven consumption of the lithium (or other chemicals) in the cell with the result that the battery would tend to fail relatively quickly.

Referring again to FIGS. 6 and 7, the housing 644 comprises a first part 644A that is configured, i.e. shaped and dimensioned, to receive the substrate 645 and the components carried thereby. The preferred housing 644 also comprises a second part 644B that is configured, i.e. shaped and dimensioned, to receive one or more other components of the monitor 600. Advantageously, the second part 644B of the housing 644 is configured to receive the power supply, and in particular one or more batteries. Typically, the second part 644B is configured to receive one or more button cell batteries. The first and second parts 644A, 644B together define an enclosure for receiving components of the tyre monitor 600, each part defining a respective compartment, one or more openings being provided between the parts 644A, 644B to allow interconnection of components as necessary. The parts 644A, 644B are typically co-formed, e.g. by moulding, but may alternatively be fixed together by any other fixing means, e.g. adhesive or welding.

The housing 644 is shaped to define an aperture 653 through which components of the tyre monitor 600 can be inserted into, or removed from, the housing. As is described in more detail hereinafter, the aperture 653 is advantageously formed in the first part 644A of the housing and is aligned with the opening between the first and second parts 644A, 644B to allow the battery (and/or other components) to be inserted into the second part 644B via the first part 644A. The aperture 653 preferably occupies substantially an entire major face of the first part 644A. For ease of assembly, it is also advantageous that the aperture 653 is shaped and dimensioned to substantially match the shape and dimensions of the substrate (in plan aspect). The illustrated housing 644 includes a removable cover 655 for the aperture 653. When fitted, the cover 655 is usually sealed, e.g. by laser welding. In alternative embodiments, the cover is not used. Instead, the aperture 653 may be filled by potting, e.g. using thermo-setting plastics or a silicone rubber gel.

The first and second parts 644A, 644B of the housing are non-coplanar and non-parallel with one another. Preferably, the first and second parts 644A, 644B are substantially perpendicular with one another. In preferred embodiments, each part 644A, 644B is shaped to house at least one respective substantially planar component (the substrate 645 and one or more button cell respectively in the illustrated example) and as such is preferably substantially planar in shape, i.e. lies substantially in a respective major plane in which the respective planar component(s) also lie when in the housing. The arrangement is such that the respective major planes are non-coplanar and non-parallel with one another, preferably substantially perpendicular with one another. More generally, the first and second parts 644A, 644B of the housing are configured to hold the respective planar component(s), in particular the substrate 645 and battery(s), non-coplanar and non-parallel with one another, preferably substantially perpendicular to one another. This enables the substrate 645 and battery(s) to be oriented with respect to the wheel rim in the preferred manner described above.

In the illustrated embodiment, the first and second parts 644A, 644B are connected at respective ends, i.e. providing a substantially L-shaped cross-section. Alternatively, one of the parts 644A, 644B may intersect the other between ends, e.g. providing a substantially T-shaped cross-section. In the illustrated embodiment an end face of the second housing 644B opens onto a major face of the first housing 644A. Alternatively, an end face of the first housing 644A may open onto a major face of the second housing 644B.

In preferred embodiments, the valve 642 is coupled to the housing 644 at a valve attachment point 643. In the illustrated embodiment, releasable coupling means are provided at the attachment point 643 which conveniently comprise an anchor member 680 shaped to define an aperture (not visible) for receiving the fixing 647. The anchor 680 may be co-formed with the housing 644, e.g. during moulding, or fixed thereto by any suitable means, e.g. adhesive or welding. The attachment point 643 is advantageously positioned on top of an obverse face 682 of the second part 644B of the housing and on top of an obverse face 684 of the first part 644A of the housing, the respective obverse faces being adjacent one another. Hence, the anchor 680 sits in a seat defined by the non-parallel faces 682, 684 and as such does not add to the length or width of the housing 644. Preferably, the anchor 680 is shaped and dimensioned such that it does not add to the height of the housing 644. It is preferred to locate the attachment point 643 substantially at, or as close as possible to, the centre of gravity of the tyre monitor 600. Advantageously, the upright orientation of the first part 644A helps to position the centre of gravity of the monitor 600 such that it is close to the attachment point 643.

Referring now to FIGS. 9 to 12A, The monitor 600 is shown mounted on a wheel rim 640. The wheel rim 640 has a front 657 (sometimes referred to as the kerb side), a rear 671 (sometimes referred to as the brake side) and an inside 659 (sometimes referred to as the tyre side). The inside 659 extends between the front 657 and rear 671 and is typically shaped to define a drop well 673. In the illustrated embodiment, opposing sides of the drop well 673 are defined by a respective wall 675, 677, the walls typically being substantially parallel with the front and rear faces of the wheel rim 640. The valve 642 is inserted through a valve receiving aperture (not visible) formed in the rim 640 such that its free end 648 projects through to the front 657 of the rim 640, while the tyre monitor 600 is located at the inside 659, conveniently in the drop well 673. The preferred arrangement is such that the underside (as viewed in the drawings) of the housing 644 engages with, or is close to, the wheel rim 640 on one or more sides, conveniently on the floor and/or side wall 675 of the drop well 673. This helps to restrict movement of the housing 644 as the wheel rotates and may be achieved by appropriate positioning of the valve-receiving aperture and/or the angle formed between the valve 642 and housing 644.

In use a tyre (not shown) is fitted to the wheel rim 640 covering the inside 659 and the tyre monitor 600. The tyre monitor 600 is then exposed to the air contained by the tyre in order to monitor characteristics such as air pressure. In preferred embodiments, the tyre is a tubeless tyre. The valve 642 is typically a snap-in valve. It will be understood however, that the invention may be used with all types of valve and is not limited to use with tubeless tyres or snap-in valves. For example, the valve 642 may alternatively comprise a clamp-in valve. Clamp-in valves typically include a clamp mechanism, for example a screw clamp mechanism, that is operable (but usually not self-operating) to retain and seal the valve to the wheel rim.

FIGS. 11, 12, and 12A show a notional radial line R and a notional tangential line T at the location of the tyre monitor 600. It can be seen in particular from FIG. 12A, that the first part 644A of the housing, and therefore the substrate 645, is substantially parallel (in end view) with the radial line R and so lies in a substantially radial plane. As illustrated in FIG. 12A, in practice, the first part of the housing 644A the substrate 645 may lie in a plane substantially parallel with a radial plane rather than precisely in a radial plane, and this may be regarded as substantially in a radial plane. It can also be seen from FIG. 12A, that the second part 644B of the housing, and therefore the battery, is substantially parallel (in end view) with the tangential line T and so lies in a substantially tangential plane. In the illustrated embodiment, the first and second parts 644A and 644B of the housing are each substantially perpendicular to the wall 675. The first part 644A is substantially perpendicular to the floor of the drop well 673 while the second part 644B is substantially parallel with the floor of the drop well 673.

In preferred embodiments, the tyre monitor 600 the substrate 645 carries an antenna, for example antenna 16 of FIG. 2, for supporting wireless communication with one or more remote devices. The antenna is typically an RF antenna. Preferably, the antenna is a loop antenna. In a tyre monitor, it is desirable to orientate a loop antenna such that, when the tyre monitor is fitted to the wheel rim, the loop antenna is disposed substantially in a radial plane. Conveniently, in preferred embodiments this can be achieved by arranging the loop antenna to be substantially co-planar with the substrate 645. This is illustrated in FIG. 8, where a loop antenna 685 is provided around the substrate 645, preferably around the periphery of the substrate. Preferably, the antenna 685 is formed on the surface, e.g. the obverse or reverse face, of the substrate and/or in one or more layers of the substrate where the substrate is multi-layered, e.g. as one or more tracks of electrically conductive material. Alternatively, the loop antenna may comprise a strip of conductive material wrapped around the periphery of the substrate 645, i.e. around its edge.

Advantageously, at least some of the other components carried by the substrate 645 are located within the loop of the antenna 685. This reduces the size and mass of the tyre monitor 600 in comparison with a monitor in which the substrate and battery are coplanar since, in the latter, the loop antenna would project from the substrate surface creating empty space beneath it. Preferably, the substrate 645 is shaped and sized to match the shape and size of the loop antenna 685. In preferred embodiments, the loop of the antenna 685 is substantially rectangular except for a tapered corner portion 685'. The tapered corner 685' corresponds with the part of the antenna that, when fitted to the wheel rim, is at the rear of the tyre monitor (furthest from the side wall and floor of the drop well in the illustrated embodiment).

It will be understood from the foregoing that preferred embodiments provide a tyre monitor component substrate, e.g. PCB, that is designed to be mounted substantially vertically (with respect to the floor of the drop well). The substrate is advantageously designed and manufactured to be mounted substantially perpendicularly to the tangential plane of the drop well floor surface, and preferably also substantially perpendicularly to the side wall. This means that the electronic components on the substrate are substantially perpendicular to the plane of the drop well surface over which the monitor is mounted. Mounting the substrate in this way allows the overall length of the tyre monitor to be significantly reduced. In preferred embodiments it allows utilisation of the otherwise dead space under a separate loop antenna which is mounted perpendicularly to the substrate. This reduces the mass of a tyre monitor which has an impact on the valve design. The higher the mass of the tyre monitor, the more complex the valve design must be to survive the forces exerted during high speed driving.

Advantageously, the shape of the substrate 645 substantially matches the shape of the loop antenna 685 and so the substrate size is kept to this minimum size. The shape of the substrate is tapered so that the back of the tyre monitor 600 is less exposed to impact by the tyre.

Advantageously, the antenna, in particular a tyre monitor RF antenna, is formed on, in or around the substrate. Implementing the antenna using conductive track(s) reduces the need for solder joints or other electrical attachment methods. Integrating the loop antenna with the substrate 645 removes cost and complexity from the manufacturing process as it does not need to be handled as a separate component by manufacturing or purchasing. No manual handling is required for the antenna and the need to solder the antenna tags is eliminated.

A further advantage of preferred embodiments is that the housing 644 does not require positive retaining devices for holding the substrate 645 in place. In particular, the housing does not require any retention means for holding the substrate in position during the manufacturing process. The substrate 645 may be retained in the housing 644 after the cover 655 is fitted. In order to hold the substrate 645 in the desired position, one or more guides, e.g. one or more rails or locating projection(s) (not shown) may be provided in the housing 644, however these are only required to position the substrate 645 within the housing and do not need to prevent it from being removed. By eliminating the need for positively retaining the substrate 645 in the housing 644, the complexity of the substrate 645 and housing 644 can be reduced. As a result the overall tyre monitor 600 can be designed to have a smaller package size and weight.

Another advantage is that a pressure port seal 687 may be mounted on the exposed surface of the substrate 645 after the substrate has been inserted into the housing 644. This simplifies the assembly process and removes the need to pre-compress the seal.

The aforementioned position of the attachment point 643 is also advantageous firstly because the associated valve coupling means (e.g. anchor 680) can be provided such that it does not add to the size of the monitor 600, and secondly because it is relatively close to the centre of gravity of the monitor 600. In the illustrated embodiment, the centre of gravity of the tyre monitor 600 is located over, or in register with e.g. over the obverse face 682, the battery (not least because the battery tends to be a relatively heavy component). The position of the centre of gravity can be influenced not only by the size and shape of the housing 644 but also by the weight of the components of the monitor 600. The preferred non-coplanar orientation of the first part 644A of the housing facilitates positioning the centre of gravity of the monitor 600 such that the attachment point 643 is located substantially at, or relatively close to, the centre of gravity. Hence, the preferred position of the attachment point 643 is relatively close to the centre of gravity of the monitor 600. This helps to restrict movement of the tyre monitor 600 relative to the wheel rim 640, especially at relatively high speeds, which in turn improves the performance of the monitor 600 especially its wireless communication performance, and the seal between the valve 642 and the rim 640. Moreover, placing the valve attachment point 643 over the battery allows the physical size of the tyre monitor 600 to be kept to a minimum, keeping the attachment point 643 generally within the dimensions determined by the battery and the required loop antenna shape (which in turn determined the shape and dimensions of the housing parts 644A, 644B).

It is also advantageous that the housing 644 facilitates loading of the battery and the substrate 645 though the aperture 653. As a result the amount of laser welding is reduced. For ease of assembly, it is also advantageous that the aperture is shaped and dimensioned to substantially match the shape and dimensions of the substrate (in plan aspect).

Furthermore, the preferred substantially vertical (or radial) orientation of the substrate 645 allows the tyre monitor 600 to use a z-axis chip inductor (not shown) to replace conventional transponder coils. A z-axis chip inductor is not effective for LF communications when the substrate is horizontal with respect to the floor of the drop well. By rotating the substrate 645 so that the chip inductor coil's orientation is on the x-axis relative to the plane of the drop well floor, it becomes effective for high sensitivity applications. This design also has the advantage that the chip inductor coil extends out into free space, rather than along the substrate where ground planes and track can impede the magnetic field, reducing sensitivity. Moreover, a general purpose chip inductor may be used with a coil size large enough to be effective in high sensitivity applications, reducing the required footprint and cost of the LF coil.

In addition, with a conventional tyre monitor design where the substrate and battery are coplanar, the conductive (usually metal) tags (not shown) required to connect the battery to the substrate usually require at least one of the tags to go through a bending process, adding complexity (and therefore cost) to the manufacturing process. With preferred embodiments of the invention, the need for a bending process is eliminated since the relative orientation of the battery and the substrate allow straight tags to be used. These are easier to manufacture and can be stamped from a flat piece of metal.

The invention is not limited to use with tyre monitors that are mountable on a wheel rim. Instead, the tyre monitor may be mountable on a tyre, e.g. an inner side wall or inner tread wall. Systems that employ such tyre monitors are sometimes referred to Tyre Monitoring Systems (TMS). Typically, such tyre monitors are not coupled to a valve.

The invention is not limited to the embodiment described herein, which may be modified or varied without departing from the scope of the invention.

The invention claimed is:

1. A tire monitor for mounting on a wheel rim, the tire monitor comprising a housing configured to hold a component substrate in a substrate plane which, when said tire monitor is mounted on an interior surface of said wheel rim, is substantially perpendicular to a plane that is tangential to the interior surface of the wheel rim at the location where the tire monitor is mounted on the rim,
    wherein said housing is further configured to hold a battery in a battery plane, said battery plane being substantially perpendicular to said substrate plane and substantially parallel or substantially coplanar with said tangential plane, and
    wherein the housing comprises a valve attachment point configured to attach the housing to a valve, the valve attachment point located over the battery at a center of gravity of the tire monitor in said tangential plane.

2. A tire monitor as claimed in claim 1, wherein said housing comprises a first part configured to receive said substrate and a second part configured to receive one or more other components of the monitor, the first and second parts of the housing being non-coplanar and non-parallel with one another.

3. A tire monitor as claimed in claim 2, wherein said first and second parts are substantially perpendicular with one another.

4. A tire monitor as claimed in claim 2, wherein said second part of the housing is configured to receive one or more batteries, preferably one or more button cell batteries.

5. A tire monitor as claimed in claim 2, wherein said first and second parts of the housing are substantially planar in shape, having a respective major plane in which the respective components housed thereby lie during use, the respective major planes being non-coplanar and non-parallel with one another, preferably substantially perpendicular with one another.

6. A tire monitor as claimed in claim 1, wherein said substrate plane is also substantially transverse of the wheel rim.

7. A tire monitor as claimed in claim 1, wherein said substrate plane is oblique with respect to said tangential plane at least about an axis that is substantially perpendicular to the rotational axis of the wheel rim.

8. A tire monitor as claimed in claim 1, wherein said substrate plane is substantially radial with respect to the wheel rim.

9. A tire monitor as claimed in claim 1, wherein said substrate plane deviates angularly from a radial orientation about an axis that is substantially parallel with the rotational axis of the wheel rim, for example by up to approximately 75°, preferably by up to approximately 45°, more preferably by up to approximately 20°, and most preferably by up to approximately 10°.

10. A tire monitor as claimed in claim 9, wherein said valve attachment point is located in a space defined between said first and second parts of said housing.

11. A tire monitor as claimed in claim 10, wherein said valve attachment point is located over a respective obverse face of said first and second parts of said housing.

12. A tire monitor as claimed in claim 1 wherein said substrate plane deviates angularly from a radial orientation about an axis that is substantially radial of the wheel rim at the location of the tire monitor, for example by up to approximately 75°, preferably by up to approximately 45°, more preferably by up to approximately 20°, and most preferably by up to approximately 10°.

13. A tire monitor as claimed in claim 1, including an antenna that is substantially co-planar with said substrate.

14. A tire monitor as claimed in claim 13, wherein said antenna is provided around the substrate, preferably around the periphery of the substrate.

15. A tire monitor as claimed in claim 13, wherein said antenna is incorporated into said substrate or supported by said substrate.

16. A tire monitor as claimed in claim 13, wherein said antenna is formed on a surface of the substrate and/or in one or more layers of the substrate where the substrate is multi-layered.

17. A tire monitor as claimed in claim 13, wherein said antenna comprises a loop antenna.

18. A tire monitor as claimed in claim 13, wherein the shape and size of said substrate substantially matches the shape and size of said antenna.

19. A tire monitor as claimed in claim 1, including means for releasably coupling a tire valve to said tire monitor at said attachment point.

20. A tire monitor as claimed in claim 1, the tire monitor being coupled, optionally releasably coupled, to a tire valve, the tire monitor and tire valve assembly being configured for mounting on said wheel rim.

21. A tire monitor as claimed in claim 20, wherein said tire valve includes means for retaining, and preferably also sealing, itself in a valve aperture formed in said wheel rim, upon insertion of said tire valve into said valve aperture.

22. A tire monitor as claimed in claim 20, wherein said tire valve includes one or more resilient deformable portions for retaining, and preferably also sealing, itself in a valve aperture formed in said wheel rim.

23. A tire monitor as claimed in claim 20 wherein said tire valve comprises a snap-in valve.

24. A tire monitor as claimed in claim 20 wherein said tire valve comprises a clamp-in valve.

25. A tire monitor as claimed in claim 1, incorporated into a tire monitoring system, for example a tire pressure monitoring system.

26. A tire monitor as claimed in claim 1, wherein said tire monitor comprises a tire pressure monitor.

* * * * *